Aug. 29, 1967  L. S. BARRILLEAUX, JR., ET AL  3,338,439
CANE PLANTING MACHINE
Filed July 7, 1965  2 Sheets-Sheet 1
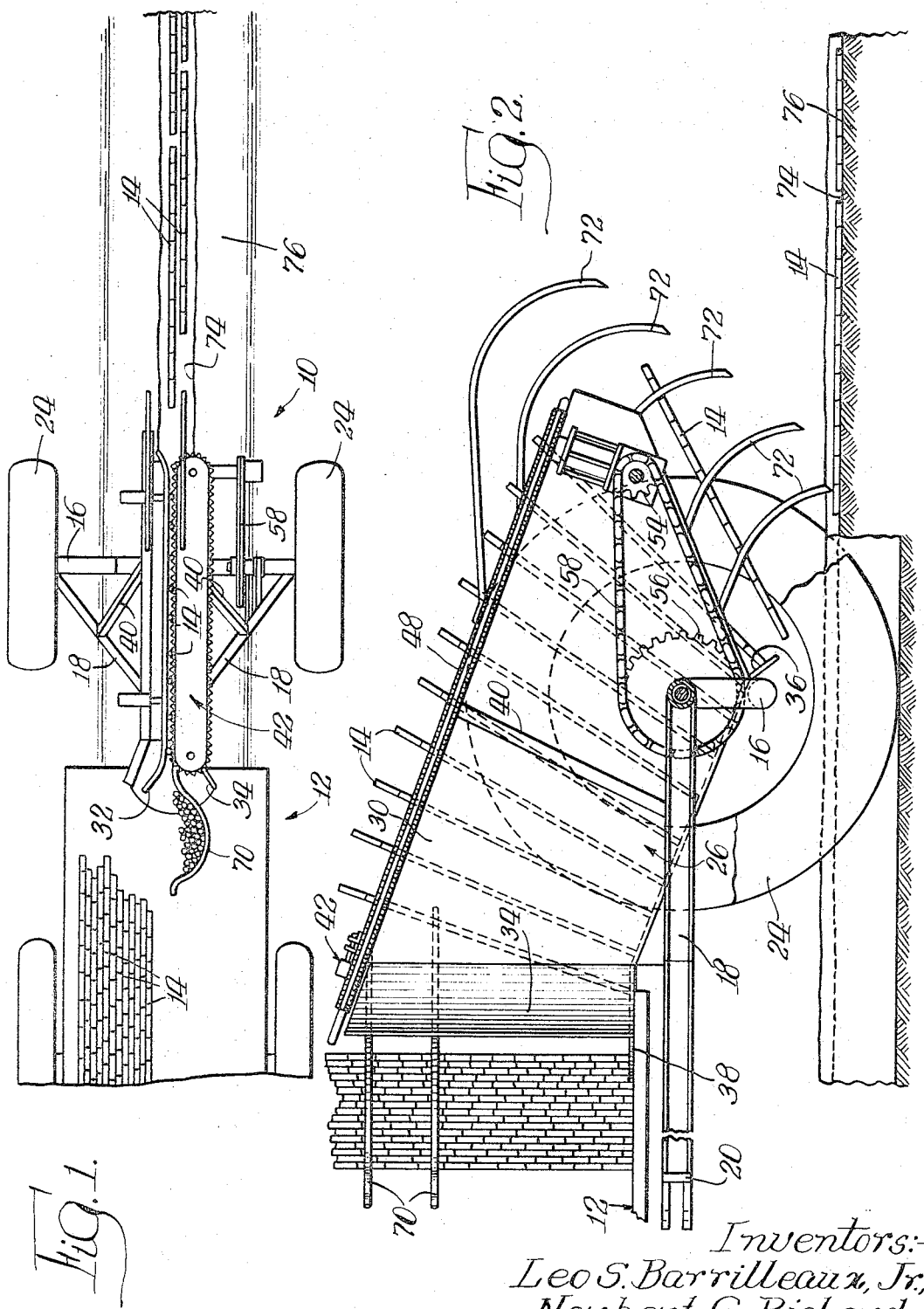
Inventors:-
Leo S. Barrilleaux, Jr.,
Norbert G. Richard,
By Brown, Jackson, Boettcher & Dienner
Attys.

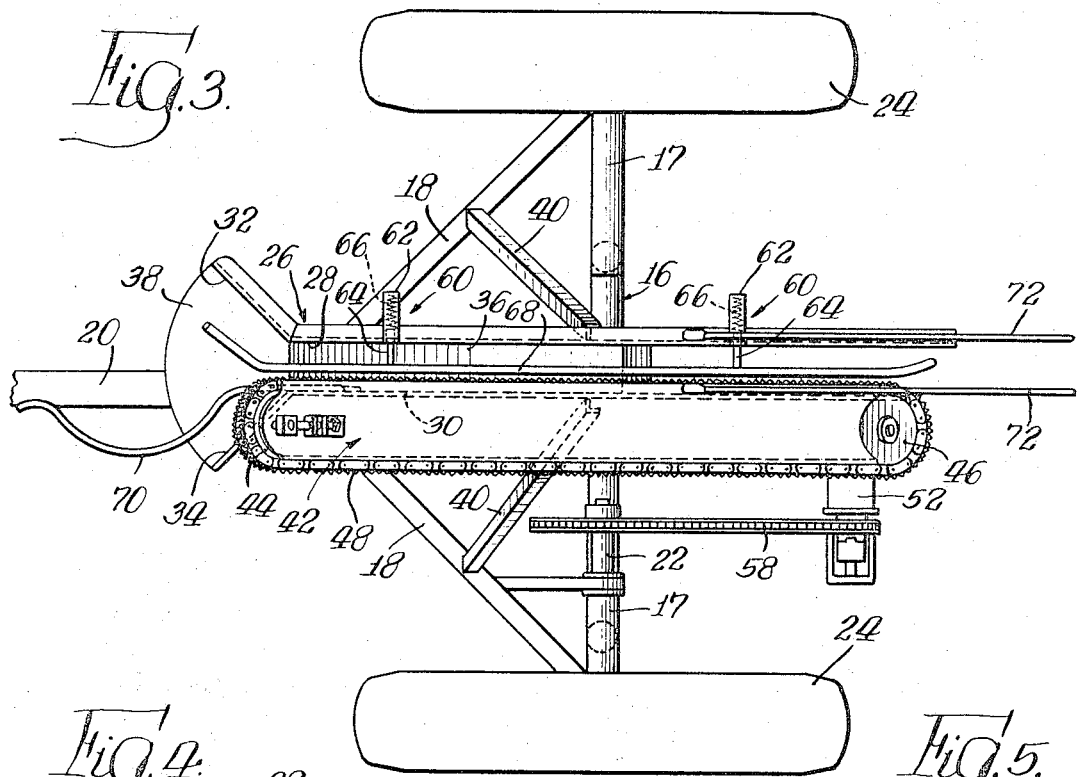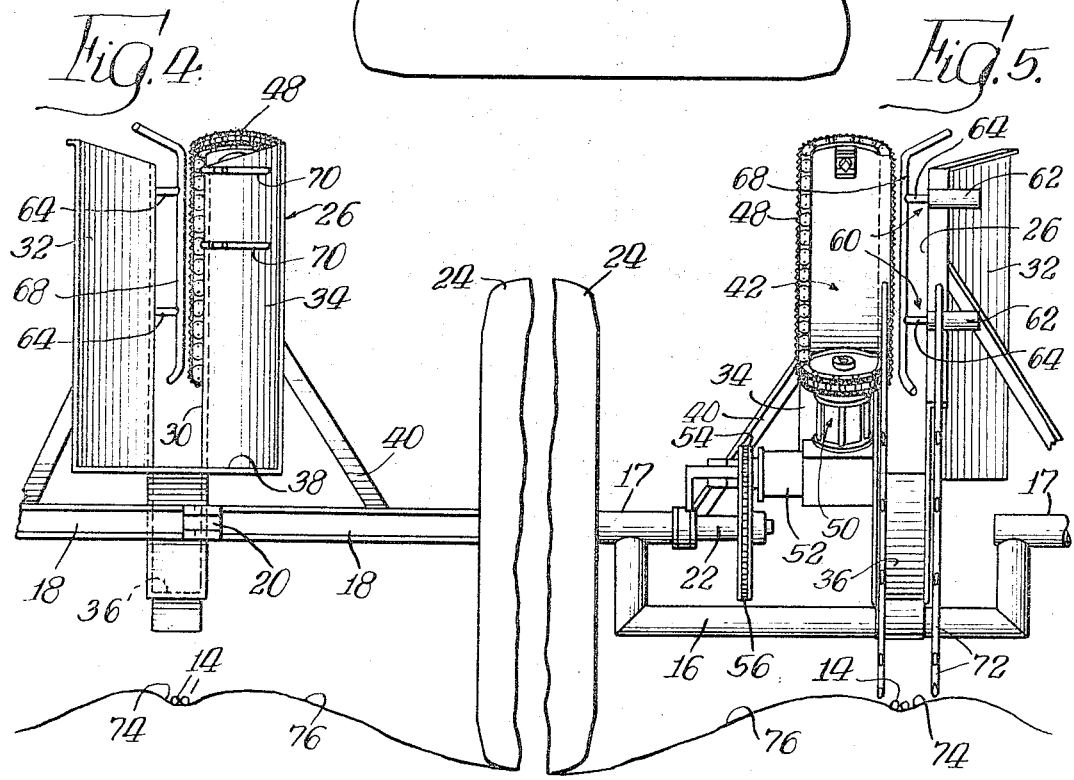

United States Patent Office 3,338,439
Patented Aug. 29, 1967

3,338,439
CANE PLANTING MACHINE
Leo S. Barrilleaux, Jr., and Norbert G. Richard, Thibodaux, La., assignors to Southdown, Inc., New Orleans, La., a corporation of Louisiana
Filed July 7, 1965, Ser. No. 470,118
6 Claims. (Cl. 214—355)

ABSTRACT OF THE DISCLOSURE

A mobile cane planting machine having cane engaging means movable in a rearwardly and downwardly inclined plane for discharging cane so that the same will fall to the ground in an orderly horizontal position.

Our present invention relates generally to a cane planting machine and more particularly to a machine which, while being moved over the furrow of a seed bed, is adapted to receive stalks of sugar seed cane at one end and discharge the stalks at the other end in such a manner that they will fall within the furrow of the seed bed in an orderly horizontal position.

It is an object of our present invention to provide a cane planting machine for automatically laying sugar cane seed in furrows thus eliminating hand spreading of seed.

It is another object of our present invention to provide a cane planting machine for laying cane seed down straight thus eliminating hand straightening.

It is another object of our present invention to provide a cane planting machine for laying down cane seed in uniform spaced relation thus promoting optimum germination.

It is a further object of our present invention to provide a cane planting machine for handling and depositing cane seed in a manner eliminating physical damage to the cane eyes on the cane seed.

Now in order to acquaint those skilled in the art with the manner of constructing and using cane planting machines in accordance with the principles of our present invention, we shall describe in connection with the accompanying drawings a preferred embodiment of our invention.

In the drawings:

FIGURE 1 is a plan view of part of a cane wagon and of the cane planting machine of our present invention overlying the furrow of a seed bed;

FIGURE 2 is a side elevational view, on an enlarged scale, of the cane planting machine of FIGURE 1, with one wheel being broken away for the sake of clarity;

FIGURE 3 is a plan view, on an enlarged scale, of the cane planting machine of FIGURE 1;

FIGURE 4 is a partial front elevational view of the cane planting machine of FIGURE 3; and FIGURE 5 is a partial rear elevational view of the cane planting machine of FIGURE 3.

Referring now to FIGURE 1, there is indicated generally by the reference numeral 10 the cane planter machine of our present invention which is adapted to be connected to the rear end of a wagon, indicated generally by the reference numeral 12, used for transporting stalks of sugar seed cane 14 normally lying horizontally therein.

The mobile cane planting machine 10, as best shown in FIGURES 3 and 5, is comprised of a main frame including a transverse depressed-center axle support frame member 16 having horizontal axle supporting ends 17, forwardly extending converging side frame members 18, and a central forwardly projecting hitch member 20. Stub axles 22 are rotatably mounted in the axle supporting frame ends 17, and secured to the outer ends of the stub axles 22 for conjoint rotation wherewith are ground-engaging wheels 24. When the hitch member 20 is suitably secured to the frame of the cane wagon 12, the cane planting machine 10 is pulled along behind the cane wagon 12 with the wheels 24 serving to support the mobile cane planting machine.

Extending lengthwise of the main frame centrally thereof (FIGURES 2, 3 and 4) is a guide trough 26 having transversely spaced vertical side walls 28 and 30 with divergent outwardly flared end portions 32 and 34, and having a normally rearwardly and downwardly inclined floor 36 with a normally horizontal front end platform section 38. The lower rear end of the trough floor 36 terminates substantially at, and may be suitably secured to, the central depressed portion of the axle support frame 16, and inclined reinforcing struts 40 are connected at their lower ends to the side frame members 18 and at their upper ends to the outboard sides of the trough side walls 28 and 30.

Extending along the upper edge of the trough side wall 30, as shown in FIGURES 2, 3 and 5, is framework 42 in which is rotatably mounted at its opposite ends a pair of sprockets 44 and 46 over which is trained a carrier chain 48 normally lying in a rearwardly and downwardly inclined plane. The sprocket 46 is secured to the output shaft of a power transmission gear box 50 which has an input shaft adapted to be connected through a clutch unit 52 with a sprocket 54. Secured to the inwardly projecting end of the adjacent stub axle 22 is a drive sprocket 56. Trained over the sprockets 54 and 56 is a drive chain 58. When the clutch unit 52 is engaged, and the wheels 24 are rotating as the planting machine 10 is being pulled by the cane wagon 12, the rotating stub axle 22 effects drive of the carrier chain 48 through the drive sprocket 56, the drive chain 58, the sprocket 54, the clutch unit 52, the gear box 50, and the sprocket 46.

Mounted at the upper edge of the trough side wall 28, which is preferably flanged over, are a pair of pressure applying and support assemblies 60 (FIGURES 3 and 5) comprised of cylinders 62 and piston rods 64 normally biased outwardly of the cylinders 62 by means of springs 66. Secured to the outer ends of the piston rods 64 and extending along the side of the carrier chain 48 adjacent the trough side wall 30 is a pressure bar 68 which serves to maintain the upper end of sugar cane in engagement with the carrier chain 48 for movement therewith as will be described hereinafter. If desired, the opposite ends of the pressure bar 68 may be bent away from the carrier chain 48.

To facilitate the feeding of cane to the planting machine 10, a pair of normally horizontal vertically spaced cane receiving guide members 70 (FIGURES 2, 3 and 4) are secured to and extend forwardly from the trough side wall 30. To facilitate laying of cane being deposited by the planting machine 10, a plurality of pairs of transversely spaced curved guide members 72 are secured to the trough side walls 28 and 30 and project rearwardly and arcuately downwardly therefrom.

In using the cane planting machine 10, the hitch member 20 is suitably connected to the frame of a vehicle such as the cane wagon 12 with the front end platform section 38 preferably lying adjacent the floor of the cane wagon. As the cane wagon 12 is moved forwardly the cane planting machine 10 is pulled therealong with the wheels 24 straddling a lengthwise seed bed with an open furrow 74 formed in the ground 76. When the clutch unit 52 is engaged, and the wheels 24 are rotating during movement of the planting machine along the ground 76, the side of the carrier chain 48 adjacent the trough side wall 30 moves in a downwardly and rearwardly direction.

During the planting operation, as illustrated in FIGURE 1, stalks of sugar seed cane 14 are first moved manually from the horizontal position in the cane wagon 12 to a vertical position at the cane receiving guide members 70. Then, the upper ends of stalks of cane are individually moved manually into position between the front ends of the carrier chain 48 and the pressure bar 68. Thereafter, the pressure bar 68 serves to hold the upper end of the cane in engagement with the carrier chain 48. As the one side of the carrier chain 48 moves rearwardly and downwardly the cane is pulled therealong through the guide trough 26 while the lower end of the cane trails across the inclined floor 36 with the cane thereby travelling in an inclined position, as shown in FIGURE 2, so that the cane when discharged at the rear end of the carrier chain 48 will fall to the ground within the furrow 74 in an orderly horizontal position. As the cane reaches the rear end of the carrier chain 48, the guide members 72 serve to maintain the cane in proper lengthwise alignment with the furrow 74 thus eliminating hand straightening.

The spacing of the cane within the furrow 74 may be varied as desired. For example, two rows of sugar seed cane may be laid in the furrow 74 with the ends of the stalks overlapping as shown in FIGURE 1. Alternatively, two rows of sugar seeds cane may be laid in the furrow 74 with the respective pairs of cane aligned coextensively side-by-side, or three rows of sugar seed cane may be laid in the furrow 74 with the stalks either being aligned coextensively side-by-side or arranged in overlapping relation. The position of the sugar seed cane in the furrow 74 is regulated by the rate at which stalks are fed to the carrier chain 48 and by the forward speed of the planting machine 10. By laying down seed cane in uniform spaced relation, optimum germination is promoted. The manner in which the cane seed is handled and deposited serves to eliminate physical damage to the cane eyes on the cane seed. When the machine 10 is not being used for planting and is being transported for example from one location to another, the clutch unit 52 may be disengaged for inactivating the carrier chain 48.

While we have shown and described what we believe to be a preferred embodiment of our present invention, it will be understood by those skilled in the art that various rearrangements and modifications may be made therein without departing from the spirit and scope of our invention.

We claim:

1. A mobile cane planting machine comprising a main frame having ground-engaging wheels at the sides thereof, a carrier chain lying in a rearwardly and downwardly inclined plane carried by said main frame for receiving stalks of sugar seed cane at the forward end and discharging the same at the rearward end, means interconnecting one of said wheels and said carrier chain for driving the latter when said one wheel is rotated, a pressure bar located along one side of said carrier chain and being arranged to hold the upper end of cane in engagement with said carrier chain, and said carrier chain serving to pull cane therealong with the cane being maintained in an inclined position so that the cane when discharged at the rear end of the carrier chain will fall to the ground in an orderly horizontal position.

2. A mobile cane planting machine comprising a main frame having ground-engaging wheels at the sides thereof, a generally rearwardly and downwardly inclined guide trough carried by said main frame, a carrier chain lying in a rearwardly and downwardly inclined plane with one side thereof arranged along the upper edge of one of the sides of said guide trough for receiving stalks of sugar seed cane at the forward end and discharging the same at the rearward end, means interconnecting one of said wheels and said carrier chain whereby the latter is driven when said one wheel is rotated, a pressure bar located along one side of said carrier chain adjacent said one side of said guide trough and being arranged to hold the upper end of cane in engagement with said carrier chain, and said carrier chain serving to pull cane through said guide trough with the cane being maintained in an inclined position so that the cane when discharged at the rear end of the carrier chain will fall to the ground in an orderly horizontal position.

3. A mobile cane planting machine comprising a main frame having ground-engaging wheels at the sides thereof, a guide trough carried by said main frame and extending lengthwise thereof, said guide trough having vertical side walls and a normally rearwardly and downwardly inclined floor, a carrier chain lying in a rearwardly and downwardly inclined plane with one side thereof arranged along the upper edge of one of said vertical side walls for receiving stalks of sugar seed cane at the forward end and discharging the same at the rearward end, means for driving said carrier chain, a pressure bar located along one side of said carrier chain adjacent said one vertical side wall and being arranged to hold the upper end of cane in engagement with said carrier chain, and said carrier chain serving to pull cane through said guide trough while the lower end of the cane trails across said inclined floor with the cane thereby travelling in an inclined position so that the cane when discharged at the rear end of the carrier chain will fall to the ground in an orderly horizontal position.

4. A mobile cane planting machine comprising a main frame having ground-engaging wheels at the sides thereof, a guide trough carried by said main frame and extending lengthwise thereof, said guide trough having vertical side walls and a normally rearwardly and downwardly inclined floor, sprockets mounted adjacent the opposite upper ends of one of said vertical side walls, a carrier chain trained about said sprockets in a rearwardly and downwardly inclined plane for receiving stalks of sugar seed cane at the forward end and discharging the same at the rearward end, drive means interconnecting one of said wheels and one of said sprockets whereby when said one wheel is rotated said carrier chain is driven, a pressure bar located along one side of said carrier chain adjacent said one vertical side wall and being arranged to hold the upper end of cane in engagement with said carrier chain, and said carrier chain serving to pull cane through said guide trough while the lower end of the cane trails across said inclined floor with the cane thereby travelling in an inclined position so that the cane when discharged at the rear end of the carrier chain will fall to the ground in an orderly horizontal position.

5. A mobile cane planting machine comprising a main frame having a transverse axle support frame member, stub axles mounted in the ends of said transverse frame member, ground-engaging wheels secured to the outer ends of said stub axles, a guide trough carried by said main frame and extending lengthwise thereof, said guide trough having vertical side walls and a normally rearwardly and downwardly inclined floor, sprockets mounted adjacent the opposite upper ends of one of said vertical side walls, a carrier chain trained about said sprockets in a rearwardly and downwardly inclined plane for receiving stalks of sugar seed cane at the forward end and discharging the same at the rearward end, drive means interconnecting one of said stub axles and one of said sprockets whereby when the ground-engaging wheel on said one stub axle is rotated said carrier chain is driven, a pressure bar located along one side of said carrier chain adjacent said one vertical side wall, pressure applying and support means secured to the upper edge of the other of said vertical side walls and normally urging said pressure bar toward said carrier chain to hold the upper end of cane in engagement with the latter, and said carrier chain serving to pull cane through said guide trough while the lower end of the cane trails across said inclined floor with the cane thereby travelling in an inclined position so that the cane when discharged at the rear end of the carrier chain will fall to the ground in an orderly horizontal position.

6. A mobile cane planting machine comprising a main frame having a transverse depressed-center axle support frame member, stub axles mounted in the ends of said transverse frame member, ground-engaging wheels secured to the outer ends of said stub axles, a guide trough carried by said main frame and extending lengthwise thereof, said guide trough having vertical side walls and a normally rearwardly and downwardly inclined floor terminating substantially at the depressed center of said transverse frame member, sprockets mounted adjacent the opposite upper ends of one of said vertical side walls, a carrier chain trained about said sprockets in a rearwardly and downwardly inclined plane for receiving stalks of sugar seed cane at the forward end and discharging the same at the rearward end, a gear box connected with one of said sprockets, a clutch unit connected to said gear box, drive means between one of said stub axles and said clutch unit whereby when the ground-engaging wheel on said one stub axle is rotated and said clutch unit is engaged said carrier chain is driven, a pressure bar located along one side of said carrier chain adjacent said one vertical side wall, pressure applying and support means secured to the upper edge of the other of said vertical side walls and normally urging said pressure bar toward said carrier chain to hold the upper end of cane in engagement with the latter, said carrier chain serving to pull cane through said guide trough while the lower end of the cane trails across said inclined floor with the cane thereby travelling in an inclined position so that the cane when discharged at the rear end of the carrier chain will fall to the ground in an orderly horizontal position, and a plurality of pairs of transversely spaced guide members projecting rearwardly from said vertical side walls to maintain the cane in lengthwise alignment.

References Cited
UNITED STATES PATENTS

| | | | |
|---|---|---|---|
| 964,820 | 7/1910 | Snyder | 111—3 |
| 1,398,190 | 11/1921 | Howard | 111—3 |
| 2,617,556 | 11/1952 | Hulett. | |
| 2,840,269 | 6/1958 | Anderson. | |
| 3,002,473 | 10/1961 | Morine | 111—2 |
| 3,073,265 | 1/1963 | Movilla et al. | 111—3 |
| 3,185,326 | 5/1965 | Vanderloop | 214—83.36 |

GERALD M. FORLENZA, *Primary Examiner.*

ALBERT J. MAKAY, *Examiner.*